(12) United States Patent
Todosiev et al.

(10) Patent No.: US 10,898,827 B2
(45) Date of Patent: Jan. 26, 2021

(54) VAPOR TRAP

(71) Applicant: Geoff Todosiev, Redondo Beach, CA (US)

(72) Inventors: Geoff Todosiev, Redondo Beach, CA (US); Art Hentschel, Brea, CA (US)

(*) Notice: Subject to any disclaimer, the term of this patent is extended or adjusted under 35 U.S.C. 154(b) by 291 days.

(21) Appl. No.: 15/901,073

(22) Filed: Feb. 21, 2018

(65) Prior Publication Data

US 2018/0178140 A1 Jun. 28, 2018

Related U.S. Application Data

(63) Continuation of application No. 15/587,460, filed on May 5, 2017, now Pat. No. 9,901,843, and a continuation of application No. 13/749,783, filed on Jan. 25, 2013, now Pat. No. 9,669,326.

(51) Int. Cl.
*B01D 1/30* (2006.01)
*B01D 1/00* (2006.01)
*B01D 11/02* (2006.01)

(52) U.S. Cl.
CPC .............. *B01D 1/30* (2013.01); *B01D 1/00* (2013.01); *B01D 11/0288* (2013.01); *B01D 11/0292* (2013.01); *B01D 11/0296* (2013.01)

(58) Field of Classification Search
None
See application file for complete search history.

(56) References Cited

U.S. PATENT DOCUMENTS

| | | |
|---|---|---|
| 3,152,914 A | 10/1964 | Taylor |
| 3,480,446 A | 11/1969 | Hollenbeck |
| 3,535,118 A | 10/1970 | Klein |
| 3,783,163 A | 1/1974 | Patel |
| 3,939,291 A | 2/1976 | Katz |
| 3,979,528 A | 9/1976 | Mahlmann |
| 4,335,149 A | 6/1982 | Stipp |
| 4,865,868 A | 9/1989 | Kuss |
| 5,043,177 A | 8/1991 | Chimel et al. |
| 5,114,443 A * | 5/1992 | Overby .................. B01D 5/009 137/205 |
| 5,922,384 A | 7/1999 | Blackwell et al. |
| 6,513,524 B1 | 2/2003 | Storz |
| 6,715,494 B1 | 4/2004 | McCoy |
| 7,089,812 B2 | 8/2006 | Månsson et al. |
| 7,622,140 B2 | 11/2009 | Whittle |
| 7,997,280 B2 | 8/2011 | Rosenthal |
| 2012/0095088 A1 | 4/2012 | Hospodar |

* cited by examiner

*Primary Examiner* — Russell G Fiebig
(74) *Attorney, Agent, or Firm* — Lambert Shortell & Connaughton; David J. Connaughton, Jr.; Gary E. Lambert

(57) ABSTRACT

A method of capturing a vaporized component or components, and apparatus for same is provided. The method involves vaporization of desired components, and capture of the vaporized components in a material using a vapor trap device. Once captured, the material with the component stored therein may be used for any number of purposes including ingestion, topical administration, and/or aromatization.

16 Claims, 3 Drawing Sheets

VAPOR TRAP

BACKGROUND OF THE INVENTION

Field of the Invention

The present invention relates generally to vaporizing devices. More particularly the present invention relates to a device to capture and store components of a vapor vaporized from a vaporizing material by a vaporizing device.

Description of Related Art

The therapeutic activity of plant medicines is attributed to the active constituents which they contain. In some cases the intrinsic activity of natural products has been linked to specific chemical species, but in other cases the activity of the plant medicine is considered to be due to a combination of constituents acting in concert. In most plant materials the active constituent is present in varying proportions.

Methods of extraction which have been used to separate components of plant materials and to produce enriched extracts include maceration, decoction, and extraction with aqueous and non-aqueous solvents, and distillation.

Maceration (also known as simple maceration) is defined as the extraction of a drug in a solvent with daily shaking or stirring at room temperature. After a defined period the spent, solid material is separated from the solution (macerate). Variation on the method includes agitation of the macerate and the use of temperatures up to approximately 50 degrees C. The method was formerly used for the preparation of tinctures and extracts from low-density plant material medical, using various strengths of ethanol as the extraction solvent.

Decoction has been used since antiquity for the preparation of traditional medicines. In traditional Chinese medicine it is customary to place the quantity of herbs required for one day's treatment into a vessel to which hot or boiling water is added. The vessel is then raised to boiling point and allowed to simmer for a period of time. The decoction so produced is allowed to cool, separated from solid particles, and the decoction is used as the dosage form for oral administration.

A wide range of processes based on the use of non-aqueous or aqueous solvents to extract the constituents from plants have been used in the prior art. The solvents employed may be miscible with water or water immiscible and vary in solvent power.

Extraction with supercritical fluid $CO_2$ has been used to remove active constituents from foods such as caffeine from coffee beans, and humulene and other flavors from hops, for example.

Distillation and sublimation have been used to separate components of plant medicines which have boiling points at or around the temperature at which water boils at atmospheric pressure (100 degrees C.). Separation by distillation is a physical process widely used in the preparation of essential oils.

However, all of these processes have a number of shortcomings, particularly for a small scale process. Namely, the above processes are difficult to control, time consuming, and work intensive. Further, in many of these processes the acquired extract is in a solution or material that must again be processed, or the compound captured often fouls the solution or material it is in.

Therefore, what is needed is a device that may effectively capture volatile components from a vaporizing material such as plant material. Further what is needed is a device that may be easily used at home-scale sizes and industrial-scale applications.

SUMMARY OF THE INVENTION

The subject matter of this application may involve, in some cases, interrelated products, alternative solutions to a particular problem, and/or a plurality of different uses of a single system or article.

In one aspect, a method of infusing a vapor trapping media with a vaporized component is provided. The method involves the use of a vapor trap, and a vaporizer. The vapor trap has a reservoir for storing a vapor trapping media, and an inlet. The inlet allows passage of vapor containing the component desired to be captured into the reservoir. When activated, the vaporizer causes at least one component of the vaporizing material to be vaporized into a vapor flow. The vapor trap is arranged such that the vapor flow from the vaporizer passes into the reservoir and through the vapor trapping media. The method comprises loading a quantity of vaporizing material into the vaporizer, and loading a quantity of vapor trapping media into the reservoir. The method further involves activating the vaporizer, and attaching the vapor trap to the vaporizer. The vaporized component from the vaporizing material may then be, at least partially, captured by the vapor trapping media. Once the vaporizer has been activated for a time sufficient to vaporize all or a majority of the compound at issue, the vaporizer may be deactivated. The vapor trapping media (now infused with the desired component) may be removed from the reservoir and used for any number of purposes including, but not limited to, ingestion, aromatization, or topical application.

In another aspect, a device for capturing a component of a vapor is provided. The device comprises a vaporizer and a vapor trap, the vapor trap is in communication with a vaporizer outlet. The vaporizer has an air pump, an air inlet upstream of the air pump, an air heater in communication with the air pump, a vaporization chamber in communication with the air pump and downstream of the air heater, and a vaporizer outlet downstream of the vaporization chamber. In operation, a quantity of a vaporizing material is positioned within the vaporization chamber.

The vapor trap forms an interior reservoir and has a vapor inlet and a vapor outlet positioned on opposite sides. A first container is positioned just downstream of the vapor inlet, which is configured to allow a vapor inlet flow and simultaneously prevent escape of the vapor trapping media through the vapor inlet. A second container is positioned just upstream of the vapor outlet, configured to allow a vapor outlet flow and simultaneously to prevent escape of the vapor trapping media through the vapor outlet. In some embodiments, the vapor trap may have a cap. The cap may be removably attached to the vapor trap, and allowing removal of the vapor trapping media when the cap is in an open position. A quantity of vapor trapping media is positioned within the reservoir and is configured to capture a vaporized component of the vaporizing material. In some embodiments, the vapor trapping media may be selected to be a material desirable for ingestion after the component desired from the vaporizing material is captured by the vapor trapping media.

DETAILED DESCRIPTION

Figure 1:
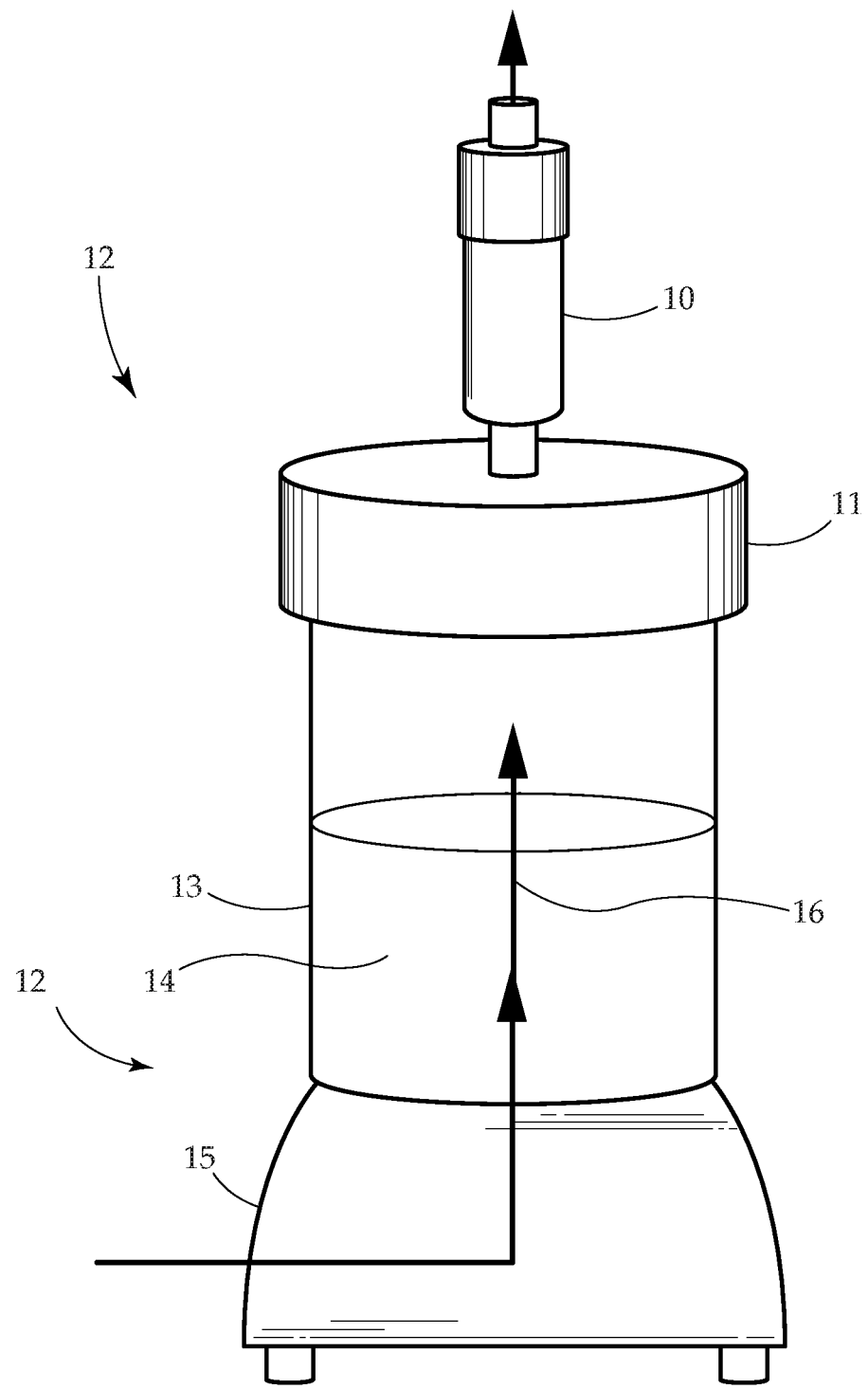
FIG. 1 provides a view of an embodiment of an apparatus for capturing vapor components.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns a vapor trap configured to capture vapor components emitted from a vaporizer.

The vapor trap generally forms a reservoir, a vapor inlet, and a vapor outlet. The reservoir may be sized to receive and store a quantity of vapor trapping media. In one embodiment the reservoir may be substantially cylindrical in shape; however it should be understood that any shaped reservoir may suffice. In an embodiment wherein a granular solid vapor trapping media is used, the reservoir may be shaped to facilitate fluidization of the granular material by a vapor flow through the reservoir.

The vapor inlet may be sized to receive a vapor input into the reservoir to allow the vapor to pass over or through the vapor trapping media. The vapor inlet may be connected to an outlet of a vaporizer from which the desired vapor flow comes. In one embodiment, the vapor inlet may be formed as an aperture in the vapor trap, with a tube or similar structure connecting the inlet to the vaporizer outlet.

The vapor outlet may be any aperture or vent that may allow escape of vapor flow or air flow, depending on vapor trap configuration. In one embodiment, the vapor outlet may be a tubular protrusion extending from a top of the vapor trap.

In one embodiment, a valve or orifice diameter may be positioned at the vapor inlet of the vapor trap to regulate flow into the vapor trap. In another embodiment, a valve or orifice diameter may be positioned at the vapor outlet of the vapor trap to regulate flow out of the vapor trap. In yet another embodiment, valves or orifice diameters may be positioned at both the inlet and the outlet of the vapor trap.

In an alternative embodiment, the vapor trap may include only an inlet and a reservoir. In this embodiment, the reservoir may be formed as a balloon or other closed container. A vapor trapping media may be disposed within, and the reservoir may be filled with vapor from the vaporizer.

A container such as a filter, membrane, mesh, check valve or the like may be positioned at or near the vapor inlet and/or outlet. The container is configured to contain the vapor trapping media within the reservoir, preventing its escape from the vapor inlet and/or outlet. Thus, the container may be any material or structure capable of allowing passage of vapor, but preventing or limiting passage of the vapor trapping media.

In embodiments wherein a liquid vapor trapping media is used, a vapor diffuser may be positioned at or near the vapor inlet to diffuse the vapor into small bubbles evenly across a cross section of the reservoir.

In one embodiment, the diffuser and container may be the same structure. In other words, the container may prevent or limit fluid flow through it, but may allow vapor flow. In many embodiments, the diffuser and/or container are formed of porous, inert materials. In one embodiment, a thin, porous polyethylene layer may act as both the diffuser and container at the vapor inlet. In another embodiment, a porous piece of glass may act as both the diffuser and container.

In a further embodiment, the container may be formed from a non-inert material that may allow for selective trapping or absorption of vaporized components.

The vapor trap may further comprise a removable cap configured to be removably attached thereto, allowing replacement of the vapor trapping media when open, and containing the vapor trapping media when closed. In one embodiment, the cap is positioned by the vapor outlet. In another embodiment, the cap is positioned by the vapor inlet. The cap may be removably attached to the vapor trap in any manner including, but not limited to: a threaded connector, snap fit, pressure fit, slideable connection, gravity connection, and the like.

In another embodiment, two or more vapor traps may be in series. In this embodiment, a first vapor trap may have an inlet attached to a vaporizer outlet, while a second vapor trap may have an inlet attached to the first vapor trap outlet. In this embodiment, increased vapor trapping efficiency may be achieved, and/or different vapor trapping media may be used to trap different vapor components.

The vapor trapping media may be removably positioned within the reservoir. This material may generally be either a liquid, a powdered or granular solid, crystalline and/or porous monolith, or a bed having the material disposed on its surface. Removal from the reservoir may be performed by pouring the material out, manual transfer such as scooping, scraping, or pulling out the material, a combination of the above, or more advanced techniques such as forced air removal or chemical removal.

The vapor trapping media may be any liquid or solid that may absorb, adsorb, condense, or otherwise capture the desired components to be trapped from the vapor. In the case of a liquid material, the particular material may be selected based on its efficiency in absorbing the components at issue, ability to condense and suspend the components, and/or the intended use of the vapor trapping media. For example, for polar components, a polar liquid material may be selected. Similarly for non-polar components, a non-polar liquid material may be desirable. Non-limiting examples of some liquid material may include water, oils, edible oils, alcohol-water solutions, alcohols, dimethyl sulfoxide (DMSO)—either pure or in solution, and the like.

In various alternative embodiments, condensation of the desired vaporized components may occur in an adapter, or in an elongated heating chamber.

In the case of solid vapor trapping media, the particular material may be selected based on its capability in adsorption of the desired component at issue, ability to condense and entrain the component, and/or the intended use of the vapor trapping media. Non-limiting examples of some solid materials may include activated charcoal, silica, cellulose, polymers, functionalized silica, functionalized cellulose, functionalized polymers, porous ceramics, sugar, flour, and the like. In embodiments wherein the material will be used for ingestion, sugar, flour or other granular cooking material may be selected.

In some embodiments, vapor trapping media may be stacked. Further different vapor trapping media may be stacked on top of one another. In a particular embodiment, the vapor trapping media may be a stacked granular bed of decreasing particle size from a top to bottom, or a bottom to top.

A vaporizing material may be positioned within the vaporizer to provide the component or components of the vapor to be trapped by the vapor trap. When activated, the vaporizer heats the vaporizing material to a temperature such that at least one of its volatile or semi volatile components are vaporized and released from the medium. This vapor is carried to the vapor trap inlet and at least partially trapped by the vapor trapping media. In one embodiment the vaporizer may pass heated air over and through the vaporizing material, carrying the vaporized components in the air stream from a vaporizer outlet to the vapor trap inlet.

The vaporizing material may be any substance having volatile or semi volatile components. Generally the vaporizing material is a complex composition such as plant material including herbs and spices, oils, and waxes. However, the vaporizing material may be any solid or liquid composition comprising more than one component. Common herbal vaporizing media may include, but is not limited to, *eucalyptus*, hops, chamomile, lavender, lemon balm, marijuana, sage, thyme, and the like.

The vaporizer may be any device capable of vaporizing volatile and semi volatile components of the vaporizing material. The vaporizer may be passive and use convective air flow, may be active, using forced air flow, or may use a vacuum system, drawing air through the vaporizer. Further, the vaporizer may also refer to a device that combusts the vaporizing material, and thus is not limited to vaporization of only volatile and semi-volatile components. Further, the vaporizer may be a table or desk-top unit, portable, or industrial sized. The term vapor is used herein to refer not only to vapors, but also generally to gas based solutions, mixtures, suspensions, aerosols, and the like that may be emitted from the vaporizer.

In one embodiment, an adapter may be provided to connect the vapor trap inlet to the vaporizer outlet. The adapter may be specially designed to accommodate connection of an outlet of a particular vaporizer and the inlet to the vapor trap. In one embodiment the adapter may be an air tight connector. In another embodiment, the adapter may be heat resistant to withstand heats of the vapor passing from the vaporizer outlet to the vapor inlet of the reservoir. The adapter may connect the vaporizer outlet to the vapor inlet in any manner including, but not limited to a quick release fitting, snap fit, threaded connection, pressure fit, and the like.

In a further embodiment, a heat exchanger may be placed between the outlet of the adapter and the inlet of the vapor trap. The heat exchanger may decrease a temperature of the inlet vapor to promote condensation or to prevent melting or other damage to the vapor trap.

In yet a further embodiment, a temperature probe (either analog or digital) may be positioned within the adapter between the vapor trap and the vaporizer. The temperature probe may be configured to measure the temperature of the outlet vapor flow from the vaporizer.

In another embodiment, a tubing may connect the vaporizer outlet to the vapor inlet.

In one embodiment, a chiller may be attached to, or be in communication with, the reservoir. The chiller operates to decrease a temperature of the vapor trapping media and/or the reservoir. In some embodiments, decreasing the temperature of the vapor trapping media may allow it to more effectively condense and capture aerosolized and vaporized components.

In another embodiment a heater may be attached to, or be in communication with, the reservoir. In still another embodiment, a temperature control device may be attached to or be in communication with the reservoir, the temperature control device being capable of both heating and cooling, depending on needs of the system and configuration.

A vapor storage bag, balloon, or other structure capable of storing the vapor released, may be in fluid communication with the vapor outlet. The outlet vapor may be used as an air fragrance, for inhalation, storage for later use, or may be recycled back to an air inlet of the vaporizer. The outlet vapor may be used immediately after exit from the vaporizer, or may be stored in the bag or (or similar) for later use.

After a period of passing the vapor through the reservoir and the vapor components being trapped by the vapor trapping media, the material may be ready for use and used for a variety of purposes. Uses of the vapor trapping media may include flavoring the media, use in cooking, ingestion, later aromatization or vaporization (re-release of the stored components), slow release of a stored fragrance, topical application, and the like.

In operation, a user may begin by placing the vaporizing material in the vaporizer. The vapor trap inlet may be connected to the vaporizer outlet by an adapter, tubing, or the like. A vapor trapping media may be disposed within the reservoir. Depending on vapor trapping media selected, the reservoir may be almost completely filled, or only partially filled. For example with a liquid vapor trapping media, it may be desirable to nearly fill the reservoir. In a further example, when using a granular vapor trapping media for a fluidized bed, it may be desirable to only partially fill the reservoir. Once set up as such, the vaporizer may be activated. Vapor passes from the vaporizer into the reservoir via the vapor inlet and is exposed, either by bubbling through, or passing over, the material. The residual vapor then leaves the reservoir via the vapor outlet.

In an alternate embodiment of operation, the vapor trapping media may be placed in the reservoir, and the vaporizing medium may be placed in the vaporizer. Next the vaporizer may be activated, and once activated, the vapor trap may be attached to the vaporizer.

In an embodiment of use having a granular vapor trapping media, the passage of the vapor through the reservoir may fluidize the granular material within the reservoir, creating a fluidized bed. In this embodiment, pressure of the vapor flow from the vaporizer may cause this fluidization, along with a shape of the reservoir designed to create an interior vapor velocity sufficient to fluidize the granular material. In such fluidized bed embodiments, a container such as a mesh may be positioned at the vapor outlet to prevent escape of the granular material.

In one embodiment, the vapor trapping media may not become saturated or adequately concentrated by a single vaporization of a single quantity of the vaporizing material. As such, a plurality of quantities of the vaporizing material may be vaporized and the desired component trapped by one batch of vapor trapping media to increase component concentration. Thus, the step of repeating the vaporizing process without replacing the vapor trapping media may result in more highly concentrated end product.

In one embodiment, the process herein may be utilized on a small home use scale using existing vaporizer products. In an embodiment of home use scale, the quantity of vaporizing material used may be approximately between 0.1 and 4 grams. In another embodiment, the process may be scaled up using larger vaporizers, vapor traps, and higher quantities of vaporizing material and vapor trapping media. In one embodiment of scaled up use, the quantity of vaporizing material may be approximately between 1-50 pounds, to potentially any quantity over 50 pounds.

Turning now to FIG. 1, a view of an embodiment of the vapor trap and vaporizer is provided. The vaporizer 12 comprises an air pump 15, a heat source 14 and a heating chamber 13. An air pump 15 is shown here in a base of the vaporizer, and provides air flow 16 from the ambient environment, through a heat source 14 and into a heating chamber 13. Within the heating chamber 13 is the vaporizing material, which is the composition intended to have at least one of its components vaporized by high temperature air flow 16 (or other heat source, depending on embodiment). Once the heated air passes over the vaporizing material, the air flow 16, along with the vaporized components exits the vaporizer and passes into an adapter 11. The adapter 11 connects the vaporizer 12 air outlet to the vapor trap 10. The vapor trap 10 captures vaporized components of the air mixture for later use. Residual air flows from an outlet of the vapor trap 10.

Figure 2:
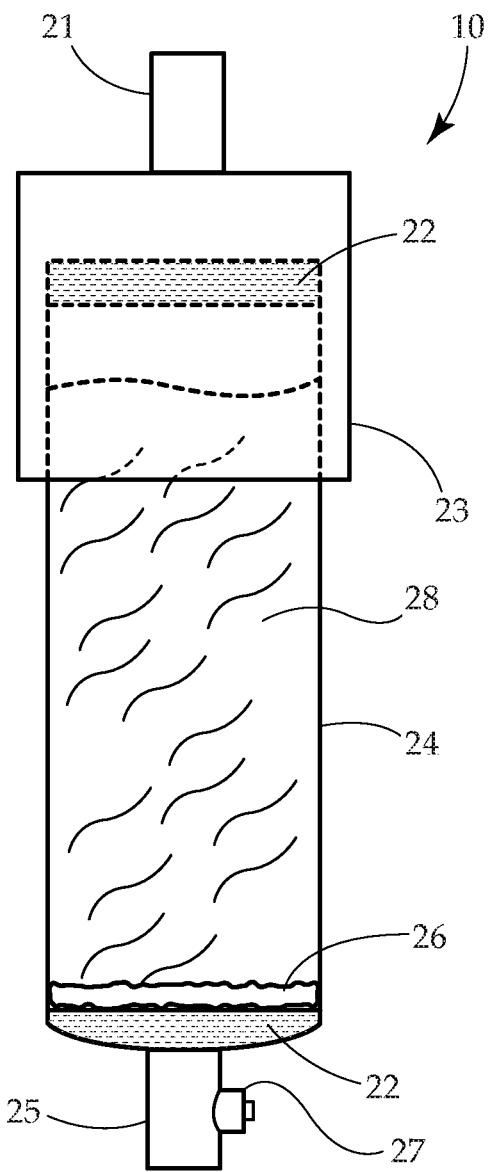
FIG. 2 provides a view of an embodiment of a vapor trap device.

FIG. 2 shows a detail view of an embodiment of the vapor trap. The vapor trap 10 has an inlet 25 allowing an inlet vapor flow. The inlet 25 is shown here as a tubular protrusion, however the inlet 25 may be any aperture capable of allowing gas flow into the vapor trap 10. An optional check valve 27 is provided to prevent any back flow out of the inlet 25. A container 22 is positioned at a bottom of the reservoir 26. The container 22 serves to contain the vapor trapping media 28 within the reservoir 26. A diffuser 26 is also positioned within the reservoir 26. The diffuser 26 serves to diffuse inlet gas evenly across the cross sectional area of the reservoir 24. In one embodiment, the diffuser 26 and container 22 may be the same material, both preventing escape of the vapor trapping media 28 and allowing inlet vapor flow. The vapor trapping media 28 is secured within the reservoir 24. It should be understood that in varying embodiments, the vapor trap may be operable without the inlet container, outlet container and/or outlet cap, among other elements.

In this embodiment, the vapor trapping media 28 is a fluid. As such, inlet vapor is bubbled through the fluid material 28 for capture. A cap 23 is attached to the top of the reservoir 24. The cap 23 may be removable and re-sealable for transferring the vapor trapping media 28 in and out of the reservoir 24. Optionally, a container 22 may be positioned at a top of the reservoir 24 or within the cap 23. This container 22 is configured to allow passage of the vapor out of the reservoir, while preventing passage of the vapor trapping media 28. An outlet 21 allows exit of the residual vapor flow. The outlet 21 is shown here as a tubular protrusion, however the outlet 21 may be any aperture capable of allowing gas flow out of the vapor trap 10.

Figure 3:
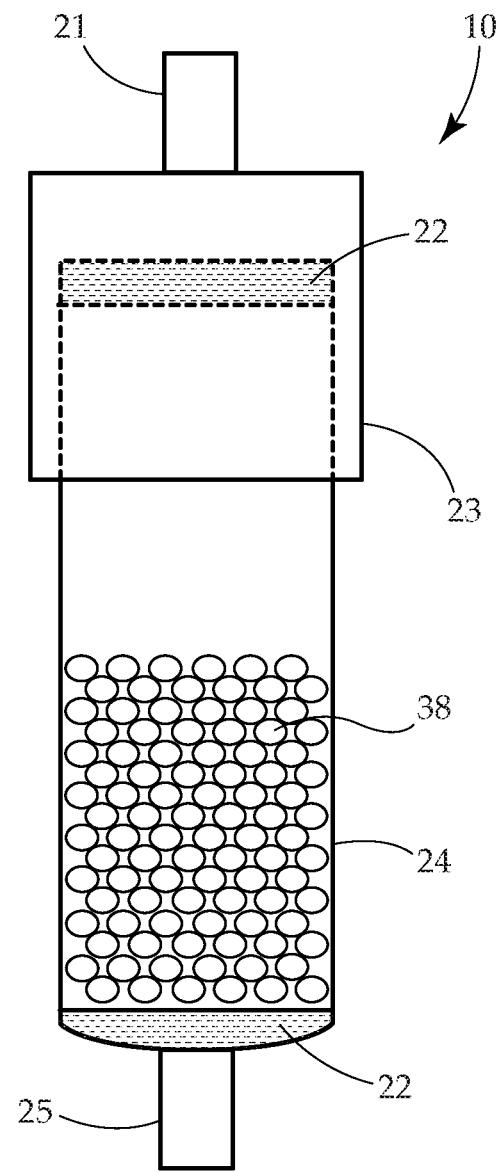
FIG. 3 provides another embodiment of a vapor trap device.

FIG. 3 shows a detail view of an embodiment of the vapor trap. This view is similar to that of FIG. 2, except that the vapor trapping media 38 is a granular solid material. The geometry of the reservoir 24, along with vapor flow rate allows the bed of granular material 38 to be fluidized in one embodiment of operation. While fluidization of the bed of vapor trapping media 38 is sometimes desirable, it should be understood that it is not necessary for operation.

Figure 4:
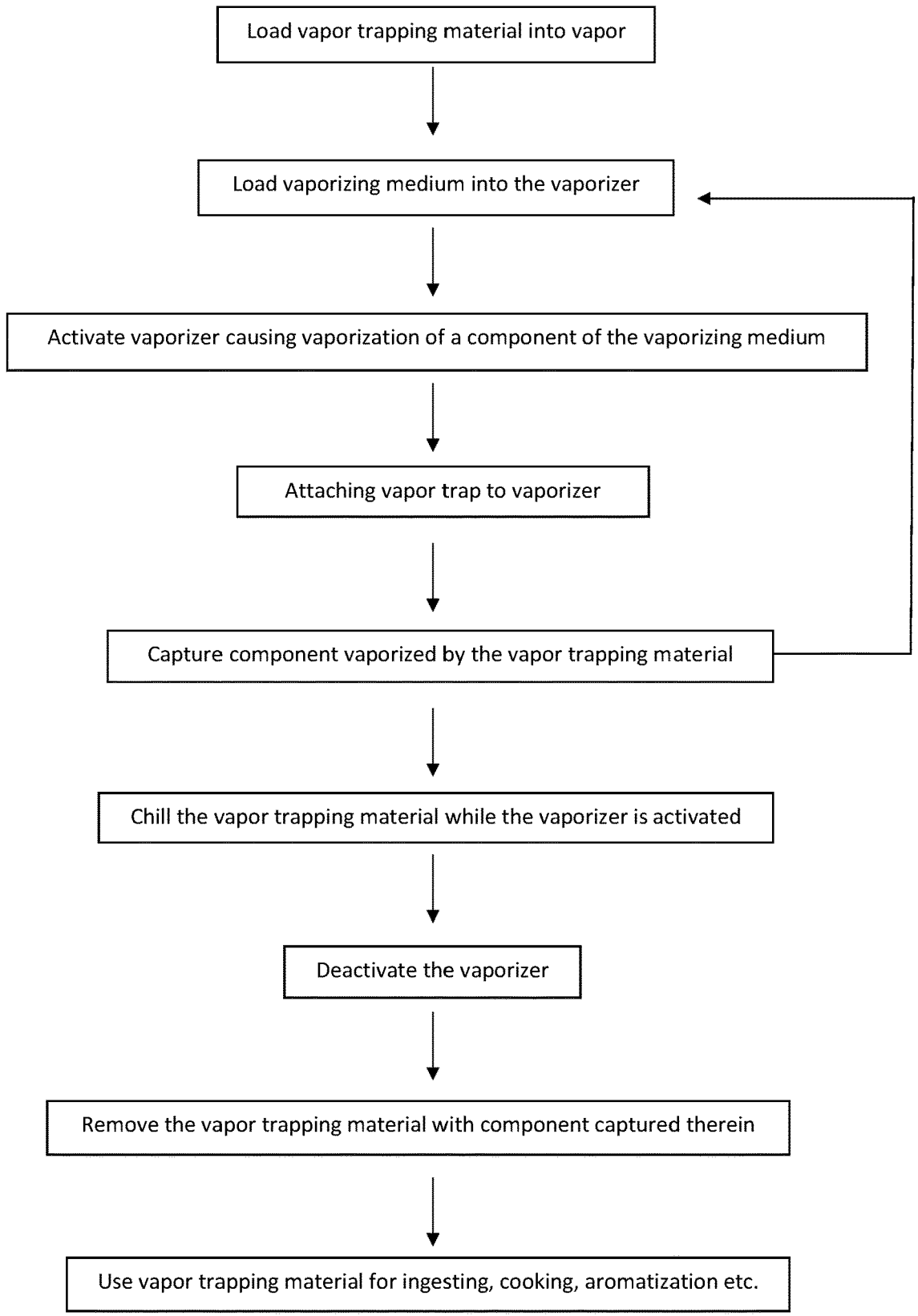
FIG. 4 provides a flow chart showing the steps of an embodiment of a method of capturing vaporized components.

FIG. 4 provides a flow chart of an embodiment of operation of the vapor trap. The flow chart begins with Vapor trapping media being loaded into the vapor trap, and vaporizing material is loaded into the vaporizer. The vaporizer may be activated which causes vaporization of one or a plurality of components of the vaporizing material. In this embodiment, the vapor trap is attached after activation of the vaporizer, however it should be understood that it may be attached before activation. Preferably an inlet of the vapor trap is connected to a vaporizer outlet, such that the outlet vapor from the vaporizer travels directly to the vapor trap. The vaporized components travel through the vaporizer outlet to the vapor trap inlet and through the vapor trapping media. The vaporized components are in turn at least partially captured by the vapor trapping media.

Depending on the desired concentration of the components in the vapor trapping media, the steps of loading vaporizing material, activating the vaporizer and capturing the component(s) may be repeated using the same quantity of vapor trapping media, thereby increasing the concentration of the components captured in the vapor trapping media. In a particular embodiment, the vapor trapping media may be chilled while the vaporizer is activated. Once the vaporizer has been activated for a time sufficient to vaporize a large percentage of the desired components of the vaporizing material, the vaporizer is deactivated. The vapor trapping media having components captured therein may then be removed from the vapor trap. The vapor trapping media may then be used for a variety of uses such as ingesting, cooking, aromatization, topical application, and the like.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A device for capturing volatile components from plant material comprising:
 a vaporizer, a quantity of plant material loaded into the vaporizer;
 a vapor trap attached to the vaporizer, the vapor trap comprising:
  a reservoir containing a quantity of vapor trapping media, a vapor inlet providing an inlet path to the reservoir, and a vapor outlet providing an outlet path from the reservoir, the vapor inlet and vapor outlet being on opposite sides of the vapor trap, the reservoir being between the vapor inlet and vapor outlet;
  a first container positioned just downstream of the vapor inlet, the first container configured to allow a vapor inlet flow and prevent escape of the vapor trapping media through the vapor inlet;
  a second container positioned just upstream of the vapor outlet, configured to allow a vapor outlet flow and to prevent escape of the vapor trapping media through the vapor outlet;
 wherein the vaporizer is configured to heat a quantity of air and pass the heated air past the plant material within the vaporizer, the heated air configured to vaporize a volatile component of the plant material forming a vapor flow, the vaporizer configured to allow the vapor flow to pass into the vapor inlet of the vapor trap, into the vapor trap reservoir and through and in contact with the vapor trapping media, and exiting the vapor trap from the vapor outlet;
 wherein the vapor trapping media is configured to capture a portion of the volatile component of the vapor flow by at least one of condensation, absorption, and adsorption of the volatile component.

2. The device for capturing volatile components from plant material of claim 1 wherein the vapor trapping media is a liquid.

3. The device for capturing volatile components from plant material of claim 2 further comprising a diffuser within the vapor trap configured to diffuse the vapor flow into a plurality of small bubbles.

4. The device for capturing volatile components from plant material of claim 1 wherein the vapor trapping media is a granular material.

5. The device for capturing volatile components from plant material of claim 1 wherein the vapor trapping media is sugar.

6. The device for capturing volatile components from plant material of claim 1 wherein the vapor trapping media is selected from the group consisting of: an edible oil, essential oils, dimethyl sulfoxide, activated charcoal, silica, cellulose, polymers, functionalized silica, functionalized cellulose, functionalized polymers, porous ceramics, sugar, flour, water, alcohol-water solutions, and alcohols.

7. The device for capturing volatile components from plant material of claim 1 wherein the volatile component is a cannabinoid.

8. The device for capturing volatile components from plant material of claim 1 further comprising a vapor storage bag attached to the vapor outlet of the vapor trap, the vapor storage bag configured to capture the vapor flow from the vapor outlet.

9. The device for capturing volatile components from plant material of claim 1 further comprising a cap, the cap being removably attached to the vapor trap, and allowing removal of the vapor trapping media when the cap is in an open position.

10. A device for capturing volatile components from plant material comprising:
  a vaporizer, a quantity of plant material loaded into the vaporizer, wherein the plant material is marijuana;
  a vapor trap removably attached to the vaporizer, the vapor trap comprising:
    a reservoir containing a quantity of vapor trapping media, a vapor inlet providing an inlet path to the reservoir, and a vapor outlet providing an outlet path from the reservoir, the vapor inlet and vapor outlet being on opposite sides of the vapor trap, the reservoir being between the vapor inlet and vapor outlet;
    a first container positioned just downstream of the vapor inlet, the first container configured to allow a vapor inlet flow and prevent escape of the vapor trapping media through the vapor inlet;
    a second container positioned just upstream of the vapor outlet, configured to allow a vapor outlet flow and to prevent escape of the vapor trapping media through the vapor outlet;
  wherein the vaporizer is configured to heat a quantity of air and pass the heated air past the plant material within the vaporizer, the heated air configured to vaporize a cannabinoid component of the plant material forming a vapor flow, the vaporizer configured to allow the vapor flow to pass into the vapor inlet of the vapor trap, into the vapor trap reservoir and through and in contact with the vapor trapping media, and exiting the vapor trap from the vapor outlet;
  wherein the vapor trapping media is configured to capture a portion of the cannabinoid component of the vapor flow by at least one of condensation, absorption, and adsorption of the volatile component.

11. The device for capturing volatile components from plant material of claim 10 wherein the vapor trapping media is a liquid.

12. The device for capturing volatile components from plant material of claim 11 further comprising a diffuser within the vapor trap configured to diffuse the vapor flow into a plurality of small bubbles.

13. The device for capturing volatile components from plant material of claim 10 wherein the vapor trapping media is a granular material.

14. The device for capturing volatile components from plant material of claim 10 wherein the vapor trapping media is sugar.

15. The device for capturing volatile components from plant material of claim 10 wherein the vapor trapping media is selected from the group consisting of: an edible oil, essential oils, dimethyl sulfoxide, activated charcoal, silica, cellulose, polymers, functionalized silica, functionalized cellulose, functionalized polymers, porous ceramics, sugar, flour, water, alcohol-water solutions, and alcohols.

16. The device for capturing volatile components from plant material of claim 10 further comprising a vapor storage bag attached to the vapor outlet of the vapor trap, the storage bag configured to capture the vapor flow from the vapor outlet.

* * * * *